US011106506B2

(12) United States Patent
Zhao et al.

(10) Patent No.: US 11,106,506 B2
(45) Date of Patent: Aug. 31, 2021

(54) MAPPING RESOURCES TO EACH LAYER OF A NEURAL NETWORK MODEL BASED COMPUTING TASK

(71) Applicant: EMC IP Holding Company LLC, Hopkinton, MA (US)

(72) Inventors: Junping Zhao, Beijing (CN); Zhi Ying, Beijing (CN); Kun Wang, Beijing (CN)

(73) Assignee: EMC IP Holding Company LLC, Hopkinton, MA (US)

( * ) Notice: Subject to any disclaimer, the term of this patent is extended or adjusted under 35 U.S.C. 154(b) by 217 days.

(21) Appl. No.: 16/397,899

(22) Filed: Apr. 29, 2019

(65) Prior Publication Data

US 2019/0384641 A1    Dec. 19, 2019

(30) Foreign Application Priority Data

Jun. 15, 2018    (CN) .......................... 201810618733.X (51) Int. Cl.
*G06F 9/50*      (2006.01)
*G06F 9/48*      (2006.01)
*G06N 3/04*      (2006.01)
*G06T 1/20*      (2006.01)

(52) U.S. Cl.
CPC .......... *G06F 9/5055* (2013.01); *G06F 9/4881* (2013.01); *G06N 3/04* (2013.01); *G06T 1/20* (2013.01)

(58) Field of Classification Search
CPC ..... G06F 2209/5011; G06F 2209/5017; G06F 9/4881; G06F 9/5027; G06F 9/5055; G06N 3/04; G06N 3/063; G06N 3/08; G06T 1/20
See application file for complete search history.

(56) References Cited

U.S. PATENT DOCUMENTS

| 2015/0121272 | A1* | 4/2015 | Hamilton ................. G06F 8/34 715/771 |
| 2019/0068519 | A1* | 2/2019 | Laird ...................... H04L 47/76 |
| 2020/0120707 | A1* | 4/2020 | Hassan Hussein ... H04W 72/14 |
| 2020/0134461 | A1* | 4/2020 | Chai ......................... G06N 3/04 |

* cited by examiner

*Primary Examiner* — Jorge A Chu Joy-Davila
(74) *Attorney, Agent, or Firm* — Ryan, Mason & Lewis, LLP (57) ABSTRACT

A method for processing a computing task comprises: determining parameter data of multiple layers associated with a neural network model in response to receiving a computing task based on the neural network model; ranking at least one part of the multiple layers on the basis of the parameter data so as to obtain a layer list; ranking multiple computing resources on the basis of status information of the multiple computing resources so as to obtain a resource list; and determining a mapping between a corresponding layer among the multiple layers and a corresponding computing resource among the multiple computing resources on the basis of the layer list and the resource list, where the mapping indicates one computing resource among the multiple computing resources is to process parameters associated with one layer among the multiple layers.

20 Claims, 9 Drawing Sheets

MAPPING RESOURCES TO EACH LAYER OF A NEURAL NETWORK MODEL BASED COMPUTING TASK

RELATED APPLICATION(S)

The present application claims priority to Chinese Patent Application No. 201810618733.X, filed Jun. 15, 2018, and entitled "Method, Apparatus, and Computer Program Product for Processing Computing Task," which is incorporated by reference herein in its entirety.

FIELD

Embodiments of the present disclosure generally relate to a computing system including dedicated computing resources, and more specifically, to a method, an apparatus and a computer program product for processing a computing task.

BACKGROUND

Applications on the client can be designed to complete various processing or analyzing tasks using computing resources, such as processing and storage resources. As the requirement and complexity of the tasks such as machine learning, deep learning, and data mining continuously grow, a large amount of and/or variable computing resources are required to satisfy operations of the corresponding application. This can be fulfilled by a machine or system having multiple dedicated computing resources, where the application can be scheduled to operate on one or more dedicated computing resources of the machine or system. For example, a cloud-based computing system has already been developed, and such a computing system includes a machine having one or more dedicated computing resources. Different clients can rent computing resources (for example, dedicated computing resources) of the system as required to operate their own applications.

With the development of computer technologies, there is an increasing variety of computing resources, and computing resources are no longer limited to traditional ones like central processing units. For example, the computing capability of graphics processing units (GPUs) has increased significantly. GPUs are particularly suitable to execute computing tasks in deep learning, high performance computing, and machine learning applications and the like by virtue of their distinctive properties. However, for ordinary client devices and conventional cloud computing devices, their GPUs are rather limited in performance and lack a high-performance processing capability. Recently, the challenge of how to process a computing task using the computing capability of a GPU of another device (i.e., remotely processing the computing task) has become a focus of research.

However, some existing technical solutions fail to make sufficient and effective use of the processing capability of remote computing resources (e.g., computing resources in a computing resource pool), whereby idleness and/or workload imbalance arises in the resource pool. Therefore, it is desirable to provide a technical solution for easily and effectively processing a computing task using multiple computing resources in a resource pool.

SUMMARY

Embodiments of the present disclosure provide a method, an apparatus and a computer program product for processing a computing task.

According to a first aspect of the present disclosure, there is provided a method for processing a computing task. The method comprises: determining parameter data of multiple layers associated with a neural network model in response to receiving a computing task based on the neural network model; ranking at least one part of the multiple layers on the basis of the parameter data so as to obtain a layer list; ranking multiple computing resources on the basis of status information of the multiple computing resources so as to obtain a resource list; and determining a mapping between a corresponding layer among the multiple layers and a corresponding computing resource among the multiple computing resources on the basis of the layer list and the resource list, wherein the mapping indicates one computing resource among the multiple computing resources is to process parameters associated with one layer among the multiple layers.

According to a second aspect of the present disclosure, there is provided an apparatus for processing a computing task, comprising: at least one processor; a volatile memory; and a memory coupled to the at least one processor, the memory having instructions stored thereon, the instructions, when executed by the at least one processor, causing the apparatus to perform acts. The acts include: determining parameter data of multiple layers associated with a neural network model in response to receiving a computing task based on the neural network model; ranking at least one part of the multiple layers on the basis of the parameter data so as to obtain a layer list; ranking multiple computing resources on the basis of status information of the multiple computing resources so as to obtain a resource list; and determining a mapping between a corresponding layer among the multiple layers and a corresponding computing resource among the multiple computing resources on the basis of the layer list and the resource list, here the mapping indicates one computing resource among the multiple computing resources is to process parameters associated with one layer among the multiple layers.

According to a third aspect of the present disclosure, there is provided a computer program product. The computer program product is tangibly stored on a computer readable medium and comprises machine executable instructions which, when executed, cause the machine to implement a method according to the first aspect.

The Summary is to introduce a selection of concepts in a simplified form that are further described below in the Detailed Description. This Summary is not intended to identify key features or essential features of the present disclosure, nor is it intended to be used to limit the scope of the present disclosure.

BRIEF DESCRIPTION OF THE DRAWINGS

Through the following more detailed description of the example embodiments of the present disclosure with reference to the accompanying drawings, the above and other objectives, features, and advantages of the present disclosure will become more apparent, wherein the same reference sign usually refers to the same component in the example embodiments of the present disclosure.

DETAILED DESCRIPTION

Preferred embodiments of the present disclosure will be described in more detail with reference to the drawings. Although the drawings illustrate preferred embodiments of the present disclosure, it should be appreciated that the present disclosure can be implemented in various manners and should not be limited to the embodiments explained herein. On the contrary, the embodiments are provided to make the present disclosure more thorough and complete and to fully convey the scope of the present disclosure to those skilled in the art.

As used herein, the term "includes" and its variants are to be read as open-ended terms that mean "includes, but is not limited to." The term "or" is to be read as "and/or" unless the context clearly indicates otherwise. The term "based on" is to be read as "based at least in part on." The terms "one example embodiment" and "one embodiment" are to be read as "at least one example embodiment." The term "a further embodiment" is to be read as "at least a further embodiment." The terms "first", "second" and so on can refer to same or different objects.

The following text also can comprise other explicit and implicit definitions. As described above, dedicated computing resources can be provided locally at the client or by a remote machine or system. In some examples, a cloud-based computing system may be deployed, which includes a plurality of machines having one or more dedicated computing resources. The dedicated computing resources of the computing system can be utilized by different clients based on their needs to dispatch the corresponding applications to operate on available dedicated computing resources.

Figure 1:
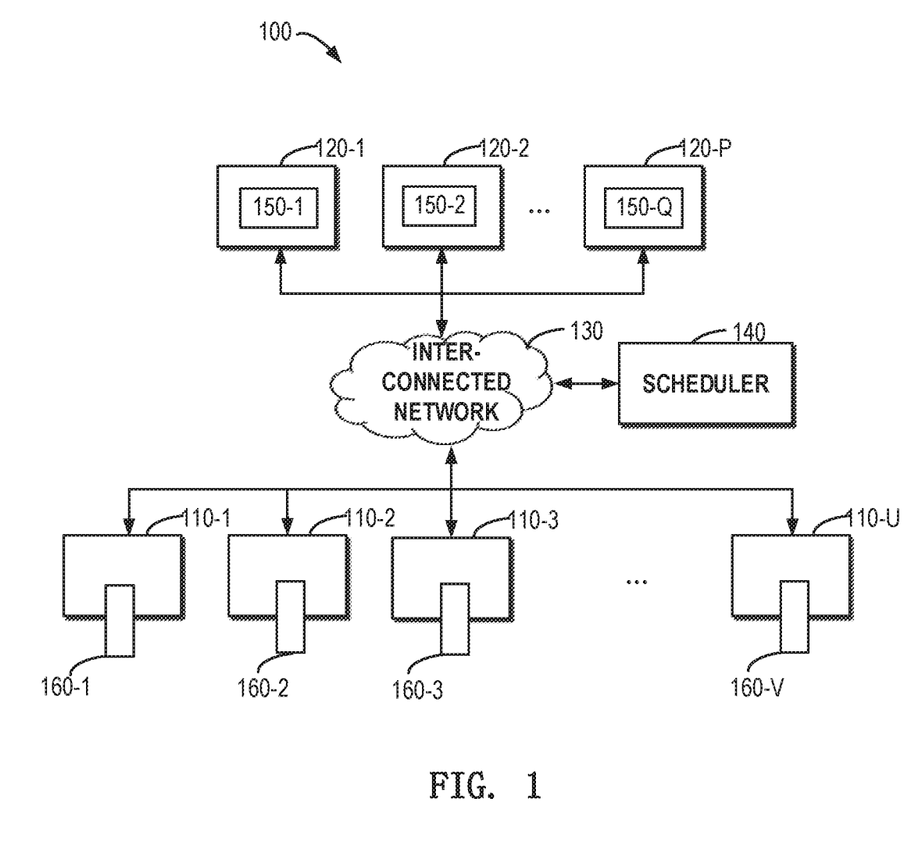
FIG. 1 schematically shows a block diagram of an example computing system in which some embodiments of the present disclosure can be implemented.

FIG. 1 is a schematic diagram illustrating an example computing system 100 in which embodiments of the present disclosure can be implemented. A plurality of servers for running applications, including a server 110-1, a server 110-2, a server 110-3, . . . , a server 110-U (hereinafter collectively or individually referred to as a server 110, where U is a natural number greater than 1), are deployed in the computing system 100. The computing system 100 further includes a dedicated computing resource 160-1, a dedicated computing resource 160-2, a dedicated computing resource 160-3, . . . , a dedicated computing resource 160-V (hereinafter collectively or individually referred to as a dedicated computing resource 160, where V is a natural number greater than 1). Each server 110 has one or more dedicated computing resources 160.

In the example of FIG. 1, the server 110-1 has the dedicated computing resource 160-1, the server 110-2 has the dedicated computing resource 160-2, the server 110-3 has the dedicated computing resource 160-3, and the server 110-U has the dedicated computing resource 160-V. It will be understood that each server is not limited to have only one computing resource, rather one server may have one or more computing resources. Therefore, here the value of U may not equal that of V.

In the context of the present disclosure, examples of the dedicated computing resource 160 may include, but not limited to, a GPU, a Field Programmable Gate Array (FPGA), or the like. For the sake of discussion, some embodiments will use a GPU as the example of the dedicated computing resources. In addition to the dedicated computing resource 160, the server 110 may further include, for example, one or more general processing units such as a central processing unit or CPU (not shown).

FIG. 1 further illustrates a plurality of clients 120-1, 120-2, . . . , 120-P (hereinafter collectively or individually referred to as a client 120, where P is a natural number greater than 1) respectively having applications 150-1, 150-2, . . . , 150-Q (hereinafter collectively or individually referred to as an application 150, where Q is a natural number greater than 1) to run. The application 150 may be any application running on the machine, and the application can be designed to perform corresponding data processing or analyzing tasks. As an example, the application 150 can perform data processing or analyzing tasks associated with a neural network. It will be appreciated that each client is not limited to having only one application, but one client may have one or more applications. Therefore, here the value of P may not equal that of Q.

To quickly and efficiently run these applications and/or save local computing resources, the client 120 may request the dedicated computing resource 160 of the server 110 to run these applications 150. In such an embodiment, the client 120 may be connected via an interconnected network 130 to one or more servers 110 and hand over the application 150 to be run by one or more dedicated computing resources 160 of the server 110. The interconnected network 130 can support different types of wired or wireless connections based on various network transmission techniques, for example, remote direct memory access (RDMA), transmission control protocol (TCP) or the like, depending on interfaces supported by the client 120, the server 110 and/or the dedicated computing resource 160.

It should be understood that the device and/or arrangement as shown in FIG. 1 is provided as an example only. In other examples, the computing system 100 can include any suitable number of servers 110 and clients 120. Each server 110 can be mounted with any suitable number of dedicated computing resources 160 and each client 120 can have a plurality of applications 150 to run. In addition, a scheduler 140, although separately shown, can be implemented by other devices independent of the server 110 in the practical application, or can be implemented at least in part on one or more servers 110.

To describe in a clear and concise manner, example embodiments of the present disclosure will be described in detail by mainly using the GPU kernel as an example. It is known that a GPU, as a dedicated processor, has strong computing capability due to a large number of kernels and high-bandwidth memory. In the GPU hardware architecture, one GPU usually has a large number of GPU kernels, such as 5120 or up to 10000 kernels. The GPU kernel, as a dedicated computing resource, is the most basic processing unit, which is also known as a stream processor (SP). Instructions and tasks are eventually processed on the GPU kernel. A plurality of GPU kernels simultaneously execute the instructions to implement parallel computing of the GPU. A plurality of SPs, in addition to other resources such as a register and shared memory, can compose one stream multiprocessor (SM).

However, it should be understood that a GPU is only an example of a dedicated computing resource, and shall not limit the scope of the present disclosure. Spirits and principles described herein can be applied to other dedicated computing resources, for example, computing resources in an accelerator such as an FPGA currently known or to be developed in the future, without limiting to the GPU kernel only.

Figure 2:
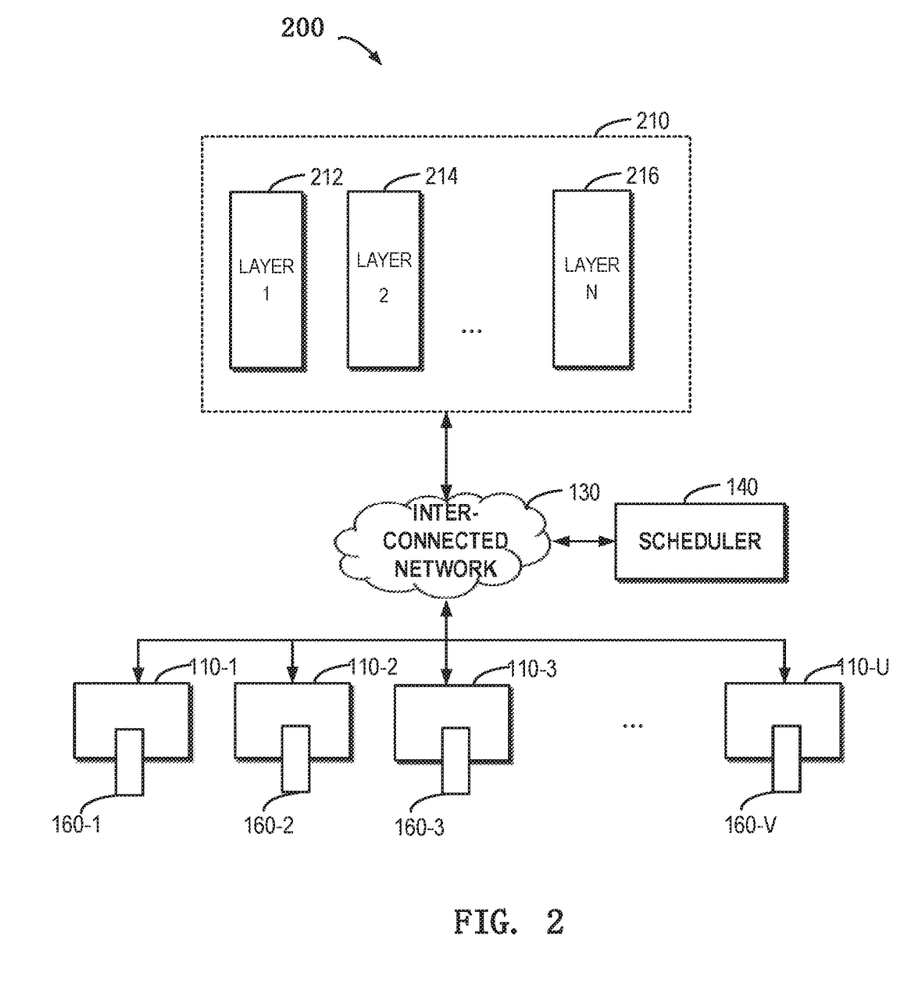
FIG. 2 schematically shows a block diagram of a process for processing a neural network model-based computing task according to one technical solution.

With the development of cloud computing, cloud architecture based technical solutions for processing a computing task have been proposed. For example, the application 120 at the client 150 may request the computing resource 160 in the server 110. It is noteworthy due to the complexity of a computing task, usually multiple computing resources need to be called. More details of the embodiment of the present disclosure will be described by using a neural network model-based computing task as a specific example. FIG. 2 schematically shows a block diagram 200 of the process for processing a neural network model-based computing task 210 according to one technical solution. As depicted, the computing task 210 may be a computing task based on a neural network model, which neural network may involve multiple layers, e.g., layer 1, layer 2, layer N denoted by reference numerals 212, 214, . . . , 216, respectively. It will be understood that each layer among layer 1 to layer N involves a large number of parameters defining the neural network model, e.g., gradient, weight, bias and other parameters. For different layers, the data number of parameters being involved will differ significantly, e.g., the number of parameters may range between tens and millions or even larger. Therefore, it is a difficult issue regarding how to process the computing task 210 by multiple computing resources (e.g., the computing resources 160-1 to 160-V) in as much of a balanced way as possible.

It will be understood that technical solutions for processing a neural network model-based computing task have been provided. In one technical solution, a mapping relationship between computing resources and layers may be built at random, and parameters for a corresponding layer may be processed by a corresponding computing resource on the basis of this mapping. In another technical solution, for one of multiple layers, status of multiple computing resources that are currently available may be detected dynamically, and a computing resource with the best status may be selected to process parameters for this layer. Since there is a great difference between workloads for processing parameters of different layers, existing technical solutions fail to effectively utilize the computing performance of multiple computing resources in the resource pool. In view of the drawbacks in the prior art, the present disclosure proposes a method for processing a computing task.

Figure 3:
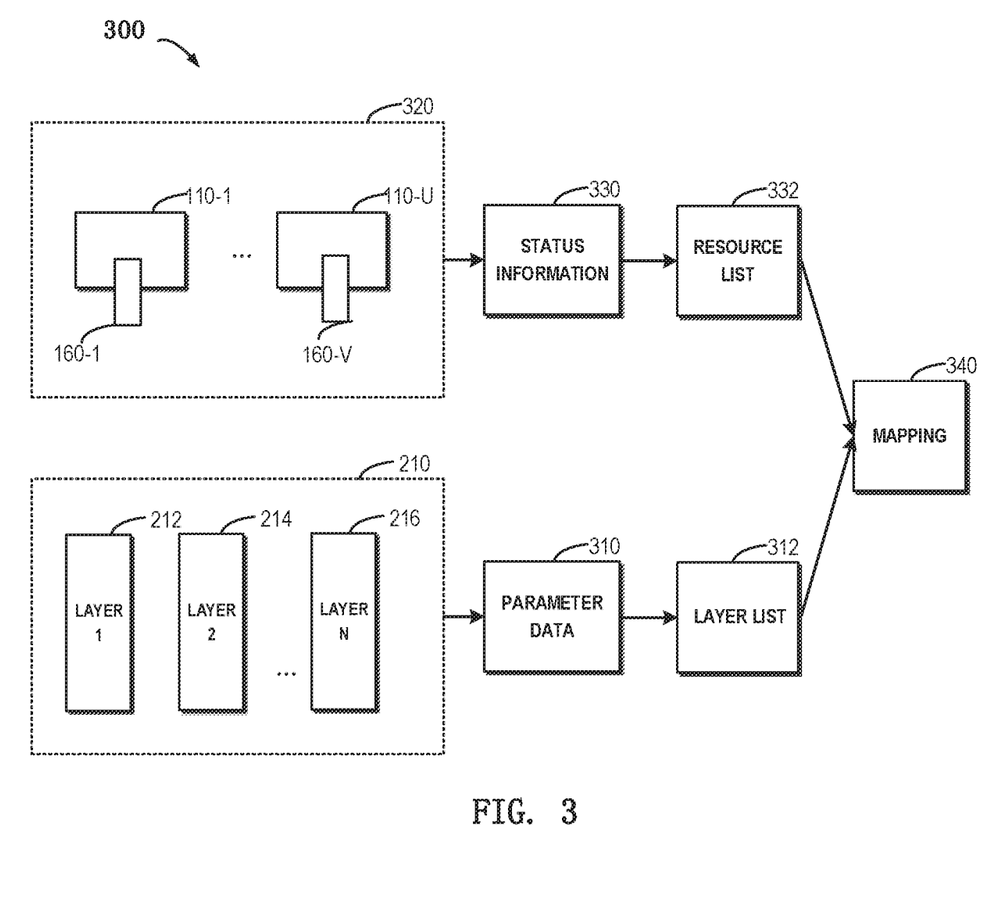
FIG. 3 schematically shows a block diagram for processing a computing task according to example embodiments of the present disclosure.

FIG. 3 schematically shows a block diagram 300 for processing a computing task according to example embodiments of the present disclosure. As depicted, status information 330 of multiple computing resources 160-1 to 160-V in a resource pool 320 may be obtained. Based on the status information 330, the multiple computing resources 160-1 to 160-V may be ranked to obtain a resource list 332. For example, these computing resources may be ranked by status in best-to-worst order or may be ranked by status in worst-to-best order.

Where the neural network model-based computing task 210 is received, configuration information of multiple layers (e.g., layer 1, layer 2, . . . , layer N denoted by reference numerals 212, 214 216 respectively in FIG. 2) associated with the neural network model may be determined. Parameter data 310 associated with the multiple layers may be obtained on the basis of the configuration information. It will be understood that in the context of the present disclosure, the multiple layers may be all or part of layers associated with the neural network model. Based on the parameter data 310, the multiple layers 212, 214, . . . , 216 may be ranked to obtain a layer list 312. For example, these layers may be ranked in increasing order or decreasing order by the number of parameters indicated by the parameter data 310. Subsequently, a mapping 340 between a corresponding layer among the multiple layers and a corresponding computing resource among the multiple computing resources 160 may be determined on the basis of the resource list 332 and the layer list 312.

Figure 4:
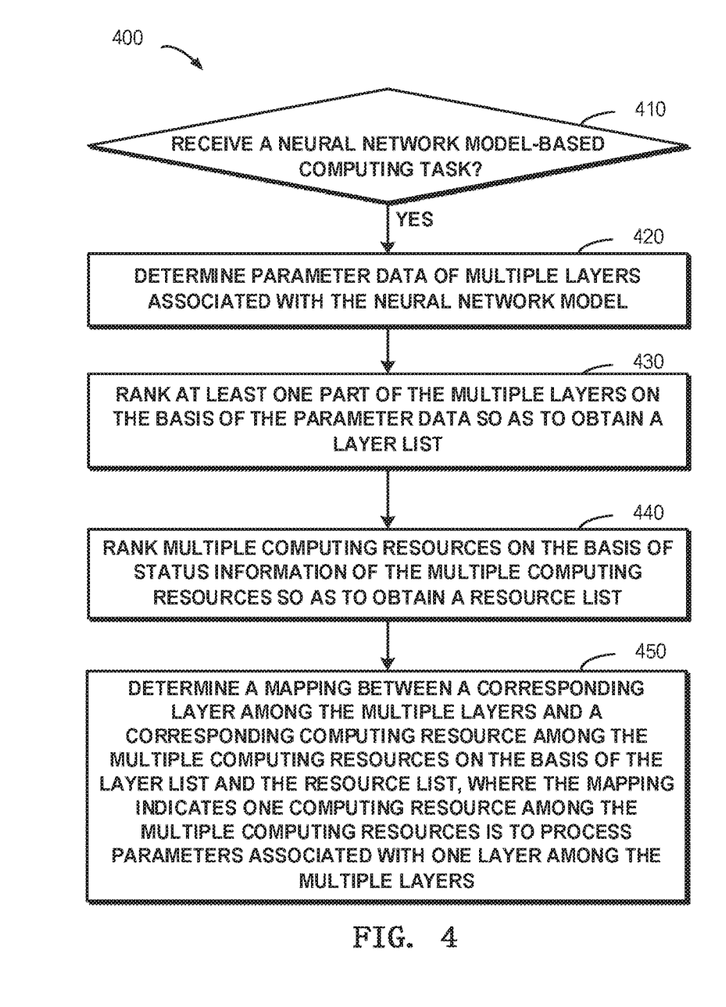
FIG. 4 schematically shows a flowchart of a method for processing a computing task according to example embodiments of the present disclosure.

FIG. 4 schematically shows a flowchart of a method 400 for processing a computing task 210 according to example embodiments of the present disclosure. At block 410, it is determined whether a neural network model-based computing task 210 is received. If yes, then the operational flow proceeds to block 420. At 420, parameter data of multiple layers associated with the neural network model are determined. According to example embodiments of the present disclosure, the multiple layers and associated configuration information may be determined based on the definition of the neural network model. At block 430, the multiple layers are ranked based on the parameter data so as to obtain a layer list. More details of obtaining the configuration information and ranking will be described below with reference to FIG. 5.

At block 440, multiple computing resources are ranked based on status information 330 of the multiple computing resources so as to obtain a resource list 332. The status information 330 here may involve indicators of various aspects of the computing resources 160. According to example embodiments of the present disclosure, the status information of the multiple computing resources 160 comprises at least any one indicator of processing capacity information, memory resource information and bandwidth resource information of the multiple computing resources 160.

At block 450, a mapping between a corresponding layer among the multiple layers and a corresponding computing resource among the multiple computing resources is determined based on the layer list and the resource list, the mapping indicating that one computing resource among the multiple computing resources will process parameters associated with one layer among the multiple layers.

According to example embodiments of the present disclosure, the memory resource information may comprise, for example, the size of an available storage space of a GPU. The indicator may be measured by an absolute value, for example, the memory of a GPU may comprise an 8 GB (Giga Bytes) storage space, while the memory of another GPU may comprise a 5 GB storage space. When the measurement of an absolute value is adopted, in order to conveniently compare memory resource information of the respective computing resources 160, a normalization rule may be specified to unify memory resource information of the multiple computing resources 160 to the same standard.

For example, suppose a memory with the largest capacity among the multiple computing resources 160 comprises 10 GB, then memory resource information of this computing resource may be set to 1, and memory resource information of other computing resource may be determined based on a ratio of memory capacity. For example, memory resource information of a computing resource comprising a 5 GB storage space may be represented as 5 GB/10 GB=0.5. Alternatively or additionally, the indicator may further be measured by a relative value. For example, suppose a GPU comprises an 8 GB storage space among which 7 GB has been used, then at this point memory resource information of this GPU may be represented as (8 GB−7 GB)/8 GB=0.125.

According to example embodiments of the present disclosure, the processing capacity information may comprise, for example, a processing capacity indicator of a GPU, which may be measured by an absolute value, such as processing frequency, the number of processor cores, etc. When the measurement of an absolute value is adopted, in order to conveniently compare processing capacity information of the respective computing resources 160, a normalization rule may be specified to unify processing capacity information of the multiple computing resources 160 to the same standard. For example, processing capacity information of each computing resource 160 may be determined based on the proportion of processing frequency of the computing resource 160 to the highest processing frequency. Alternatively or additionally, the indicator may further be measured by a relative value. For example, suppose a theoretical processing capacity of a GPU is 1 among which 50% of the processing capacity has been used by other computing tasks, then at this point an available processing capacity may be represented as 0.5.

According to example embodiments of the present disclosure, the bandwidth resource information may represent a communication bandwidth of a GPU, which may be measured for an absolute value, for example. When the measurement of an absolute value is adopted, in order to conveniently compare bandwidth resource information of the respective computing resources 160, a normalization rule may be specified to unify bandwidth resource information of the multiple computing resources 160 to the same standard. For example, bandwidth resource information of each computing resource 160 may be determined based on the proportion of a communication bandwidth of the computing resource 160 to the highest communication bandwidth. Alternatively or additionally, the indicator may further be measured by a relative value. For example, suppose a theoretical bandwidth of a GPU is 4 GB/s (per second) among which 2 GB/s of the communication bandwidth has been used by other computing task, then at this point the bandwidth resource information may be represented as 2/4=0.5.

According to example embodiments of the present disclosure, for a given computing resource among the multiple computing resources 160, importance of a corresponding indicator among the multiple indicators for the given computing resource may be determined based on the computing task 210. For example, if it is found that the computing task 210 involves a higher computation load, then higher importance may be set for the processing capacity information. If it is found that the computing task 210 involves a large amount of data, then higher importance may be set for the memory resource information. If it is found that the computing task 210 involves a large amount of data communication, then higher importance may be set for the bandwidth resource. Subsequently, status information 330 for the given computing resource 160 may be determined based on importance of a corresponding indicator and the corresponding indicator. For example, the status information 330 may be determined from Equation 1 below:

$$\text{Status }(i) = Weight_{processing\ capacity} * ProcessingCapacity + \\ Weight_{memory\ capacity} * MemoryCapacity + \\ Weight_{bandwidth} * BandWidth \quad \text{(Equation 1)}$$

In Equation 1, Status (i) represents status information of the $i^{th}$ computing resource in the resource pool 320, ProcessingCapacity represents processing capacity information, $Weight_{processing\ capacity}$ represents importance of the processing capacity information, MemoryCapacity represents memory resource information, $Weight_{memory\ capacity}$ represents importance of the memory resource information, BandWidth represents bandwidth resource information, and $Weight_{bandwidth}$ represents importance of the bandwidth resource information. According to example embodiments of the present disclosure, the status information 330 may be represented as a vector, where each dimension in the vector represents status information of a corresponding computing resource. Still with reference to FIG. 4, at block 450, a mapping between a corresponding layer among the multiple layers and a corresponding computing resource among the multiple computing resources 160 is determined based on the layer list and the resource list, the mapping indicating that one computing resource among the multiple computing resources 160 will process parameters associated with one layer among the multiple layers. In brief, if the parameter data 310 indicates a certain layer in the computing task 210 involves a higher workload, then a computing resource with better status may be selected from the resource list to process parameters associated with this layer. If the parameter data 310 indicate a certain layer in the computing task 210 involves a lower workload, then a computing resource 160 with ordinary and even worse status may be selected from the resource list to process parameters associated with this layer. In this way, the multiple computing resources 160 in the resource pool 320 may be utilized more effectively.

According to example embodiments of the present disclosure, for each layer, a computing resource for processing parameters associated with the layer may be selected. It is not limited here that all layers among the multiple layers are processed using the embodiments of the present disclosure, but only at least one part of the multiple layers may be processed using the embodiments of the present disclosure. For a further layer among the multiple layers, a computing resource for processing parameters associated with the further layer may be selected in another way. In this embodiment, a computing resource suitable to the number of parameters on a layer may be allocated for each layer involved in the neural network model by performing processing to each layer one by one.

According to example embodiments of the present disclosure, the corresponding number of parameters included in a corresponding layer among the multiple layers may be obtained based on the parameter data 310; and the corresponding layers are ranked by the corresponding number so as to obtain the layer list 312. With the example embodiments, the intensity for processing a workload required by each layer may be measured by the number of parameters included in the layer, and further a corresponding computing resource may be selected based on the workload of each layer in a simpler and more effective way.

Figure 5:
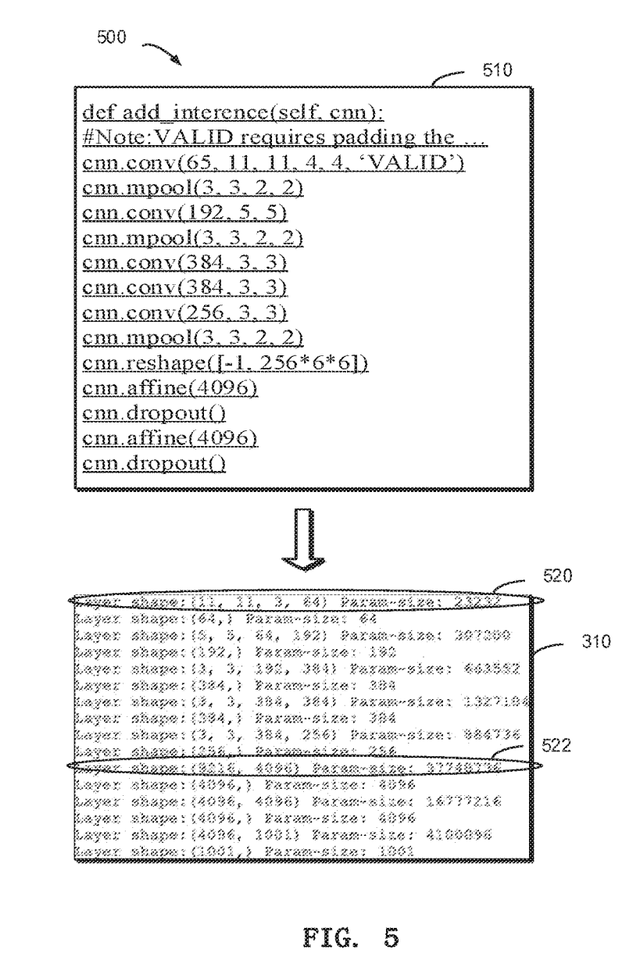
FIG. 5 schematically shows a block diagram for obtaining parameter data associated with a neural network according to example embodiments of the present disclosure.

FIG. 5 shows a block diagram 500 for obtaining parameter data associated with a neural network according to example embodiments of the present disclosure. As depicted, reference numeral 510 schematically shows configuration information of a neural network model according to example embodiments. Here, the configuration information 510 defines multiple layers comprised in the neural network model and parameters involved in each layer. Parameter data 310 associated with the neural network model may be obtained by parsing the configuration information 510.

As shown in FIG. 5, the parameter data 310 is a concrete example of parameter data according to example embodiments of the present disclosure. As shown by the parameter data 310, the neural network model may comprise multiple layers, and a field "Param-size" in each row defines the number of parameters associated with each layer. As shown in a row 520 of the parameter data 310, one layer may comprise 23232 parameters; as shown in a row 522 of the parameter data 310, one layer may comprise 37748736 parameters, etc. It will be understood that how to obtain the parameter data 310 is not limited in the context of the present disclosure. Instead, those skilled in the art may obtain the parameter data 310 according to various technical solutions that have been developed or will be developed in the future in the prior art.

According to example embodiments of the present disclosure, first statistics may be generated on the number of parameters involved in each layer, so that a computing resource may first be allocated for a layer with a larger number of parameters. For example, based on the parameter data 310 as shown in FIG. 5, corresponding numbers of parameters associated with at least one part of layers may be determined. In this example, by extracting values in the field Param-size in the parameter data 310, the number of parameters associated with each layer may be represented as: [23232, 64, 307200, 192, 663552, 384, 1327104, 384, 884736, 256, 37748736, 4096, 16777216, 4096, 4100096, 1001]. Subsequently, the at least one part of layers are ranked based on the corresponding numbers, and a first layer is selected based on the ranking. In this embodiment, the ranking may follow a decreasing order. More details will be described below with reference to FIG. 6.

According to example embodiments of the present disclosure, for a first layer among the multiple layers, a first computing resource matching with a first number of parameters of the first layer is selected from the multiple computing resources 160 based on the resource list 322, so as to process parameters associated with the first layer; and the mapping is determined based on the first layer and the first computing resource.

Figure 6:
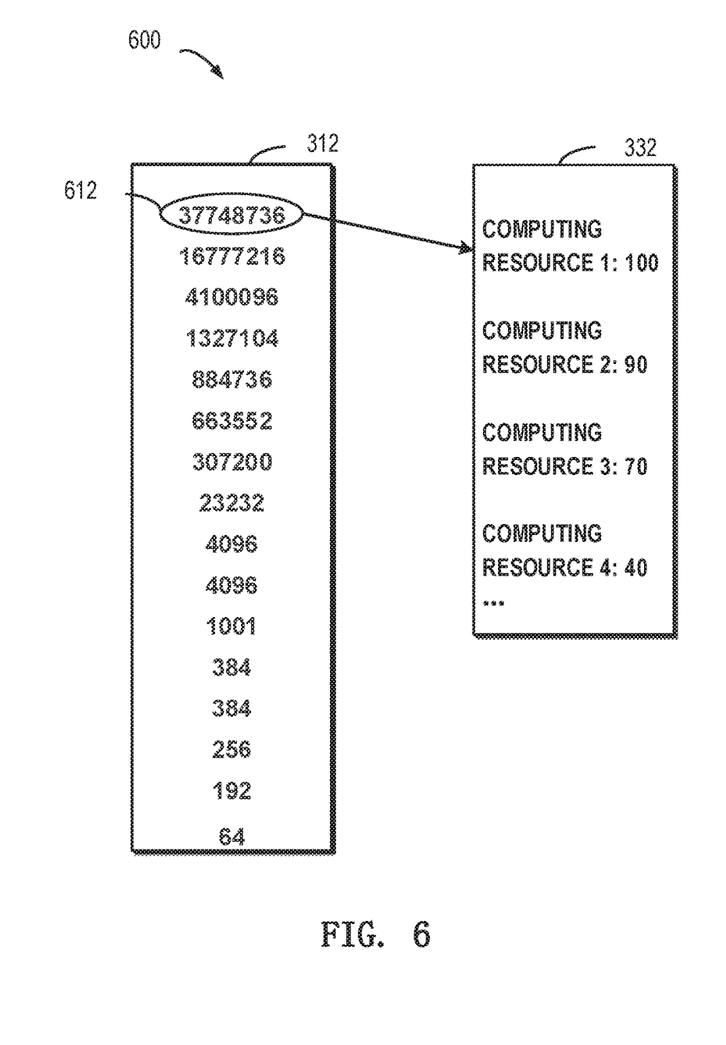
FIG. 6 schematically shows a block diagram for determining a mapping between a layer and a computing resource on the basis of a layer list and a resource list according to example embodiments of the present disclosure.

Here, a first computing resource matching with a first number of parameters of the first layer is selected from the multiple computing resources 160 based on the status information 330 of the multiple computing resources 160, so as to process parameters associated with the first layer. Each layer in the layer list 312 may be processed one by one. FIG. 6 schematically shows a block diagram 600 for determining a mapping between a layer and the computing resource 160 based on the layer list 312 and the resource list 332 according to example embodiments of the present disclosure. As depicted, the layer list 312 is formed by ranking various layers in decreasing order by the number of parameters, and the resource list 332 is formed by ranking the multiple computing resources 160 by the status information 330 in a best-to-worst order.

As shown in FIG. 6, the resource list 332 may be stored as a vector, where the $i^{th}$ dimension stores status information 330 of the $i^{th}$ computing resource determined with the above method. In this example, only status information for the computing resources 1, 2, 3, 4 and the like as determined with the above method is shown. It will be understood although the status information is normalized to a value range between 0 and 100 in the example of FIG. 6, in other example the status information may further be normalized to other value range. Alternatively or additionally, the status information may be measured using an absolute value. At the header of the layer list 312 in FIG. 6, for a layer 612 involving 37748736 parameters, since the layer 612 involves a larger workload, the computing resource 1 with the best status may first be selected from the multiple computing resources 160 in the resource pool 320.

According to example embodiments of the present disclosure, a first resource allocation required for processing parameters associated with the first layer is determined; the status information is updated based on the first resource allocation; and the multiple computing resources are ranked based on the updated status information so as to obtain an updated resource list. With the example embodiments, the first resource allocation that has been allocated for processing the first layer may be deducted from a corresponding computing resource so as to determine a currently available portion in the corresponding computing resource. In this way, it can be guaranteed that the status information 330 is updated in time, and further it can be guaranteed that the status information 330 can accurately reflect the latest status of the multiple computing resources 160 in the resource pool 210. More details of the updating will be described below with reference to FIG. 7.

Figure 7:
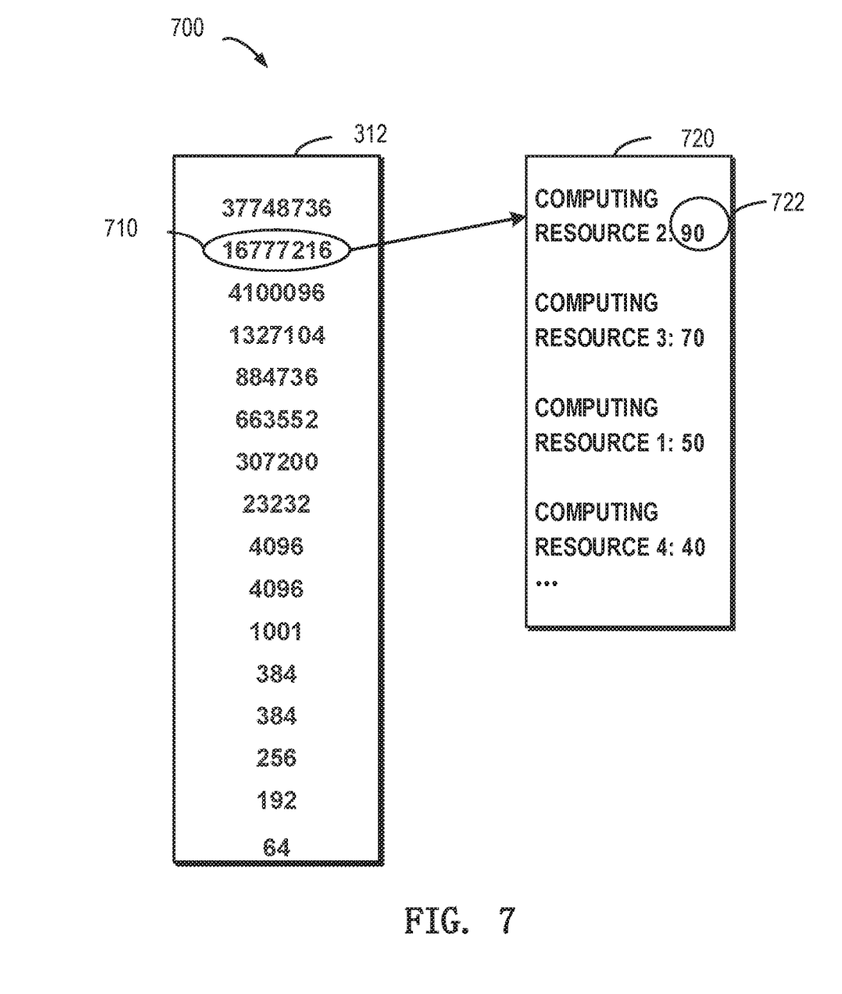
FIG. 7 schematically shows a block diagram for determining a mapping between a layer and a computing resource on the basis of a layer list and an updated resource list according to example embodiments of the present disclosure.

As shown in FIG. 6, the number of parameters involved in the layer 612 is 37748736. Suppose to process the layer 612 will occupy 50% of the resource allocation in the computing resource 1, then at this point relevant status information of the computing resource 1 in the status information 330 may be updated based on the resource allocation. For example, the relevant status information of the computing resource 1 may be updated as 100−100*50%=50. At this point, the relevant status information of the computing resource 1 has been updated to 50, and status information of the computing resources 2 and 3 in the existing resource list 332 is 90 and 70 respectively, higher than 50. Then, the resource list 332 may be updated, and the computing resource 1 is updated to the third place in the resource list 332. FIG. 7 schematically shows a block diagram 700 for determining a mapping between a layer and a computing resource based on the layer list and the updated resource list according to example embodiments of the present disclosure. As depicted in FIG. 7, the updated resource list is as shown by a reference numeral 720.

According to example embodiments of the present disclosure, other layers may be processed in a similar way of processing the first layer. For example, regarding a second layer neighboring the first layer among the multiple layers, a second computing resource matching with a second number of parameters of the second layer is selected from the multiple computing resources 160 based on the updated resource list 332, so as to process parameters associated with the second layer; and the mapping is determined based on the second layer and the second computing resource.

Still with reference to FIG. 7, the computing resource 160 may be selected for parameters of a layer 710 ranked as the second one. As depicted, the computing resource 2 may be selected to process parameters involved in the layer 710. The number of parameters involved in the layer 710 is 16777216. Suppose to process the layer 710 will occupy 60% of the resource allocation in the computing resource 2, at this point relevant status information of the computing resource 2 in the status information 330 may be updated based on the resource allocation. For example, the relevant status information of the computing resource 2 may be updated as 90-100*60%=30. Subsequently, the relevant status information of the computing resource 2 as denoted by a reference numeral 722 may be updated to 30 (FIG. 7 only shows status information "90" that has not been updated, but does not show the updated status information "30"). Like the above description, after the relevant status information of the computing resource 2 is updated from 90 to 30, a resource list 720 needs to re-ranked. At this point, since status information of the computing resources 3, 1 and 4 is 70, 50 and 40 respectively, more than 30, the computing resource 2 ranks the $4^{th}$ in the updated status list.

According to example embodiments, the layer list 312 is ranked in order by the corresponding number, the resource list 332 is ranked in order of status information of the multiple computing resources, and selecting the second computing resource comprises: selecting a computing resource at an endpoint position in the updated resource list 332 as the second computing resource.

Figure 8:
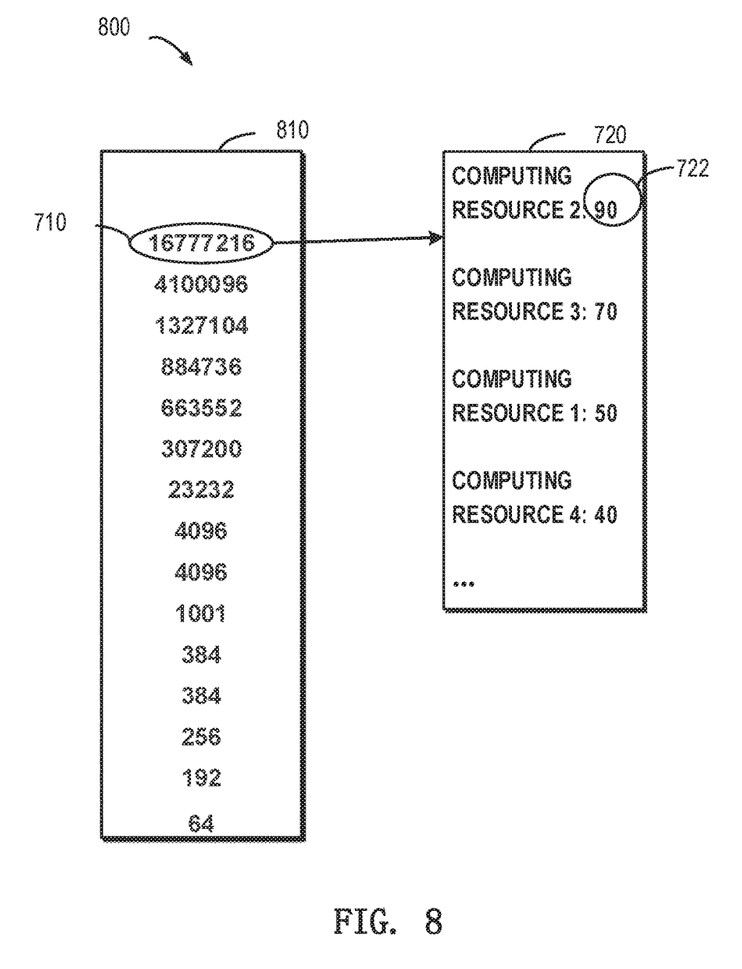
FIG. 8 schematically shows a block diagram for determining a mapping between a layer and a computing resource on the basis of an updated layer list and an updated resource list according to example embodiments of the present disclosure.

FIG. 8 schematically shows a block diagram 800 for determining a layer and a computing resource based on the updated layer list and the updated resource list according to example embodiments of the present disclosure. The above example only describes the circumstance where the resource list 332 is updated. According to example embodiments of the present disclosure, the layer list 312 may further be updated. In the embodiments, a layer that has been processed may be deleted from the layer list (e.g., a layer at the header position in the layer list 312 in FIG. 7). At this point, as shown in FIG. 8, a layer and a computing resource may be selected from the header of a layer list 810 and a resource list respectively, and a mapping relationship may be built between the selected layer and computing resource.

In this way, for the layer list 312, a processed layer may be deleted from the layer list 312 upon completion of each round. For the resource list 332, the ranking of computing resources may be updated based on an allocated resource upon completion of each round, and a computing resource with the strongest computing capability may be arranged at the header of the resource list 332. In this way, it may be determined conveniently and quickly which computing resource is used to process parameters of which layer.

According to example embodiments of the present disclosure, the number of computing resources required for processing the multiple layers may be predetermined, and a corresponding computing resource may be selected from the resource pool 320 with the above method. When the number of computing resources being selected reaches a desired number, no further computing resource is selected from the resource pool 320, but when selecting a computing resource 160 for a further layer subsequently, the computing resource for processing parameters associated with the further layer in the at least one part of layers may be selected from the computing resources 160 that have been selected. In this way, it can be guaranteed that the total number of selected computing resources matches with the computing task.

For example, suppose it is determined that 5 computing resources need to be called for executing the computing task 210. Regarding a ranked layer list shown at block 312 in FIG. 7, the first 5 computing resources with the best status may be selected from the resource pool 320 to process parameters associated with layers ranking $1^{st}$ to $5^{th}$. Subsequently, for layers ranking $6^{th}$ and below, a corresponding computing resource is still selected from the selected 5 computing resources.

It will be understood although description has been presented to the circumstances where the two lists are ranked in decreasing order of the number of parameters in a layer and in decreasing order of the computing capability of a computing resource, in other example embodiments the two lists may further be ranked in increasing order, or one list is ranked in increasing order while the other list is ranked in decreasing order.

As examples of the method according to the present disclosure have been described in detail with reference to FIGS. 2 to 8, the method may be implemented in an apparatus. According to example embodiments of the present disclosure, provided is an apparatus for processing a computing task. The apparatus comprises: a determining module configured to determine parameter data of multiple layers associated with a neural network model in response to receiving a computing task that is based on the neural network model; a layer list determining module configured to rank at least one part of the multiple layers on the basis of the parameter data so as to obtain a layer list; a resource list determining module configured to rank multiple computing resources on the basis of status information of the multiple computing resources so as to obtain a resource list; and a mapping determining module configured to determine a mapping between a corresponding layer among the multiple layers and a corresponding computing resource among the multiple computing resources on the basis of the layer list and the resource list, where the mapping indicates one computing resource among the multiple computing resources is to process parameters associated with one layer among the multiple layers.

Figure 9:
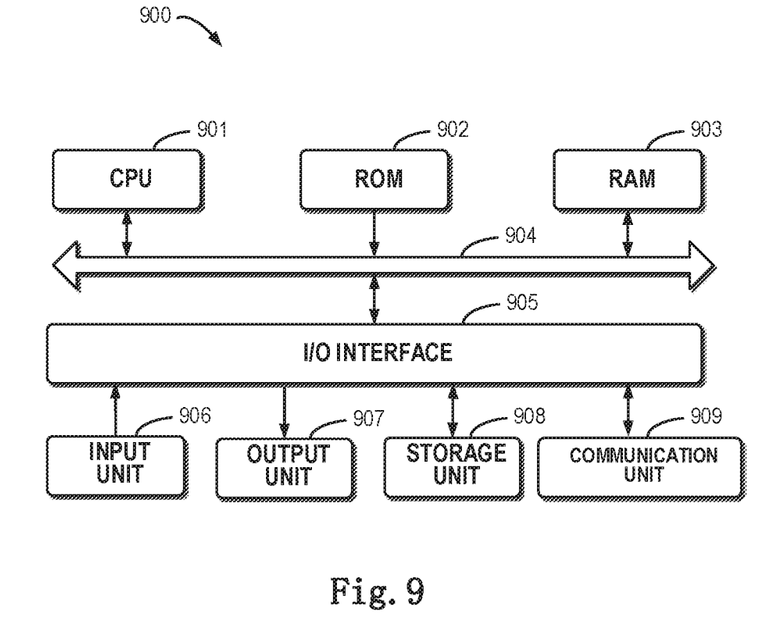
FIG. 9 schematically shows a block diagram of an apparatus for processing a computing task according to example embodiments of the present disclosure.

FIG. 9 schematically shows a block diagram of an apparatus 900 for processing a computing task according to example embodiments of the present disclosure. As depicted, the apparatus 900 includes a central process unit (CPU) 901, which can execute various suitable actions and processing based on the computer program instructions stored in the read-only memory (ROM) 902 or computer program instructions loaded in the random-access memory (RAM) 903 from a storage unit 908. The RAM 903 can also store all kinds of programs and data required by the operations of the apparatus 900. CPU 901, ROM 902 and RAM 903 are connected to each other via a bus 904. The input/output (I/O) interface 905 is also connected to the bus 904.

A plurality of components in the apparatus 900 is connected to the I/O interface 905, including: an input unit 906, such as keyboard, mouse and the like; an output unit 907, e.g., various kinds of display and loudspeakers etc.; a storage unit 908, such as magnetic disk and optical disk etc.; and a communication unit 909, such as network card, modem, wireless transceiver and the like. The communication unit 909 allows the apparatus 900 to exchange information/data with other devices via the computer network, such as Internet, and/or various telecommunication networks.

The above described each procedure and processing, such as the method 400, can also be executed by the processing unit 901. For example, in some embodiments, the method 400 can be implemented as a computer software program tangibly included in the machine-readable medium, e.g., the storage unit 908. In some embodiments, the computer program can be partially or fully loaded and/or mounted to the apparatus 900 via ROM 902 and/or the communication unit 909. When the computer program is loaded to the RAM 903 and executed by the CPU 901, one or more steps of the above described method 400 can be implemented. Alternatively, in other embodiments, the CPU 901 also can be configured in other suitable manners to realize the above procedure/method.

According to example embodiments of the present disclosure, there is provided an apparatus for processing a computing task, comprising: at least one processor; a volatile memory; and a memory coupled to the at least one processor, the memory having instructions stored thereon, the instructions, when executed by the at least one processor, causing the apparatus to perform acts. The acts include: determining parameter data of multiple layers associated with a neural network model in response to receiving a computing task based on the neural network model; ranking at least one part of the multiple layers on the basis of the parameter data so as to obtain a layer list; ranking multiple computing resources on the basis of status information of the multiple computing resources so as to obtain a resource list; and determining a mapping between a corresponding layer among the multiple layers and a corresponding computing resource among the multiple computing resources on the basis of the layer list and the resource list, where the mapping indicates one computing resource among the multiple computing resources is to process parameters associated with one layer among the multiple layers.

According to example embodiments of the present disclosure, obtaining the layer list comprises: obtaining a corresponding number of parameters comprised by a corresponding layer among the multiple layers on the basis of the parameter data; and ranking the multiple layers on the basis of the corresponding number so as to obtain the layer list.

According to example embodiments of the present disclosure, determining the mapping comprises: for a first layer among the multiple layers, selecting, on the basis of the resource list, a first computing resource matching with a first number of parameters of the first layer from the multiple computing resources so as to process parameters associated with the first layer; and determining the mapping on the basis of the first layer and the first computing resource.

According to example embodiments of the present disclosure, the acts further comprise: determining a first resource allocation required for processing parameters associated with the first layer; updating the status information on the basis of the first resource allocation; and ranking the multiple computing resources on the basis of the updated status information so as to obtain an updated resource list.

According to example embodiments of the present disclosure, the acts further comprise: for a second layer neighboring the first layer among the multiple layers; selecting, on the basis of the updated resource list, a second computing resource matching with a second number of parameters of the second layer from the multiple computing resources so as to process parameters associated with the second layer; and determining the mapping on the basis of the second layer and the second computing resource.

According to example embodiments of the present disclosure, the layer list is ranked in order of the corresponding numbers, the resource list is ranked in order of status information of the multiple computing resources, and selecting the second computing resource comprises: selecting a computing resource at an endpoint position of the updated resource list as the second computing resource.

According to example embodiments of the present disclosure, determining status information of the multiple computing resources comprises: monitoring resource information of the multiple computing resources; and determining status information of the multiple computing resources on the basis of the resource information.

According to example embodiments of the present disclosure, resource information of the multiple computing resources comprises at least any one indicator of: processing capacity information, memory resource information and bandwidth resource information of a corresponding computing resource among the multiple computing resources.

According to example embodiments of the present disclosure, determining status information of the multiple computing resources on the basis of the resource information further comprises: for a given computing resource among the multiple computing resources, determining importance of a corresponding indicator among the multiple indicators for the given computing resource on the basis of the computing task; and determining status information for the given computing resource on the basis of the importance of the corresponding indicator and the corresponding indicator.

According to example embodiments of the present disclosure, the multiple computing resources are multiple graphics processing units.

According to example embodiments of the present disclosure, there is provided a computer program product. The computer program product is tangibly stored on a computer readable medium and comprises machine executable instructions which, when executed, cause the machine to implement the method according to the present disclosure.

According to example embodiments of the present disclosure, there is provided a computer readable medium. The computer readable medium is stored with machine executable instructions thereon, the machine executable instructions, when executed by at least one processor, causing the at least one processor to implement the method according to the present disclosure. The present disclosure can be method, device, system and/or computer program product. The computer program product can include a computer-readable storage medium, on which the computer-readable program instructions for executing various aspects of the present disclosure are loaded.

The computer-readable storage medium can be a tangible apparatus that maintains and stores instructions utilized by the instruction executing apparatuses. The computer-readable storage medium can be, but not limited to, such as electrical storage device, magnetic storage device, optical storage device, electromagnetic storage device, semiconductor storage device or any appropriate combinations of the above. More concrete examples of the computer-readable storage medium (non-exhaustive list) include: portable computer disk, hard disk, random-access memory (RAM), read-only memory (ROM), erasable programmable read-only memory (EPROM or flash), static random-access memory (SRAM), portable compact disk read-only memory (CD-ROM), digital versatile disk (DVD), memory stick, floppy disk, mechanical coding devices, punched card stored with instructions thereon, or a projection in a slot, and any appropriate combinations of the above. The computer-readable storage medium utilized here is not interpreted as transient signals per se, such as radio waves or freely propagated electromagnetic waves, electromagnetic waves propagated via waveguide or other transmission media (such as optical pulses via fiber-optic cables), or electric signals propagated via electric wires.

The described computer-readable program instruction can be downloaded from the computer-readable storage medium to each computing/processing device, or to an external computer or external storage via Internet, local area network, wide area network and/or wireless network. The network can include copper-transmitted cable, optical fiber transmission, wireless transmission, router, firewall, switch, network gate computer and/or edge server. The network adapter card or network interface in each computing/processing device receives computer-readable program instructions from the network and forwards the computer-readable program instructions for storage in the computer-readable storage medium of each computing/processing device.

The computer program instructions for executing operations of the present disclosure can be assembly instructions, instructions of instruction set architecture (ISA), machine instructions, machine-related instructions, microcodes, firmware instructions, state setting data, or source codes or target codes written in any combinations of one or more programming languages, where the programming languages consist of object-oriented programming languages, e.g., Smalltalk, C++ and so on, and traditional procedural programming languages, such as "C" language or similar programming languages. The computer-readable program instructions can be implemented fully on the user computer, partially on the user computer, as an independent software package, partially on the user computer and partially on the remote computer, or completely on the remote computer or server. In the case where remote computer is involved, the remote computer can be connected to the user computer via any type of networks, including local area network (LAN) and wide area network (WAN), or to the external computer (e.g., connected via Internet using the Internet service provider). In some embodiments, state information of the computer-readable program instructions is used to customize an electronic circuit, e.g., programmable logic circuit, field programmable gate array (FPGA) or programmable logic array (PLA). The electronic circuit can execute computer-readable program instructions to implement various aspects of the present disclosure.

Various aspects of the present disclosure are described here with reference to flow chart and/or block diagram of method, apparatus (system) and computer program products according to embodiments of the present disclosure. It should be understood that each block of the flow chart and/or block diagram and the combination of various blocks in the flow chart and/or block diagram can be implemented by computer-readable program instructions.

The computer-readable program instructions can be provided to the processing unit of general-purpose computer, dedicated computer or other programmable data processing apparatuses to manufacture a machine, such that the instructions that, when executed by the processing unit of the computer or other programmable data processing apparatuses, generate an apparatus for implementing functions/actions stipulated in one or more blocks in the flow chart and/or block diagram. The computer-readable program instructions can also be stored in the computer-readable storage medium and cause the computer, programmable data processing apparatus and/or other devices to work in a particular manner, such that the computer-readable medium stored with instructions contains an article of manufacture, including instructions for implementing various aspects of the functions/actions stipulated in one or more blocks of the flow chart and/or block diagram.

The computer-readable program instructions can also be loaded into computer, other programmable data processing apparatuses or other devices, so as to execute a series of operation steps on the computer, other programmable data processing apparatuses or other devices to generate a computer-implemented procedure. Therefore, the instructions executed on the computer, other programmable data processing apparatuses or other devices implement functions/actions stipulated in one or more blocks of the flow chart and/or block diagram.

The flow chart and block diagram in the drawings illustrate system architecture, functions and operations that may be implemented by system, method and computer program product according to multiple embodiments of the present disclosure. In this regard, each block in the flow chart or block diagram can represent a module, a part of program segment or code, wherein the module and the part of program segment or code include one or more executable instructions for performing stipulated logic functions. In some alternative embodiments, it should be noted that the functions indicated in the block can also take place in an order different from the one indicated in the drawings. For example, two successive blocks can be in fact executed in parallel or sometimes in a reverse order dependent on the involved functions. It should also be noted that each block in the block diagram and/or flow chart and combinations of the blocks in the block diagram and/or flow chart can be implemented by a hardware-based system exclusive for executing stipulated functions or actions, or by a combination of dedicated hardware and computer instructions.

Various embodiments of the present disclosure have been described above and the above description is only exemplary rather than exhaustive and is not limited to the embodiments of the present disclosure. Many modifications and alterations, without deviating from the scope and spirit of the explained various embodiments, are contemplated. The selection of terms in the text aims to best explain principles and actual applications of each embodiment and technical improvements made in the market by each embodiment, or enable other ordinary skilled in the art to understand embodiments of the present disclosure.

What is claimed is:

1. A method for processing a neural network model-based computing task, comprising:
    determining parameter data of multiple layers of the computing task associated with a neural network model in response to receiving the computing task, wherein the parameter data comprises one or more of a gradient, a weight, and a bias;
    ranking a given number of layers of the multiple layers on the basis of a size of the parameter data so as to obtain a layer list, wherein the size of the parameter data is based at least in part on the number of parameters associated with each layer;
    determining status information of multiple computing resources, wherein the multiple computing resources comprise dedicated computing resources located among multiple servers;
    ranking the multiple computing resources on the basis of the status information of the multiple computing resources so as to obtain a resource list, the status information comprising one or more of an indicator of processing capacity information, an indicator of memory resource information and an indicator of bandwidth resource information of the multiple computing resources;

determining a mapping between a corresponding layer among the multiple layers and a corresponding computing resource among the multiple computing resources on the basis of the layer list and the resource list, the mapping indicating the corresponding computing resource among the multiple computing resources is to process parameters associated with the corresponding layer among the multiple layers; and causing allocation of the corresponding computing resource and processing the parameters associated with the corresponding layer based on the mapping;

wherein determining status information of the multiple computing resources comprises, for a given computing resource among the multiple computing resources:

determining importance of a corresponding indicator among the multiple indicators for the given computing resource on the basis of the computing task; and determining status information for the given computing resource on the basis of the importance of the corresponding indicator.

2. The method of claim 1, wherein obtaining the layer list comprises:

obtaining a corresponding number of parameters comprised by a corresponding layer among the multiple layers on the basis of the parameter data; and ranking the multiple layers on the basis of the corresponding number so as to obtain the layer list.

3. The method of claim 2, wherein determining the mapping comprises: for a first layer among the multiple layers, selecting, on the basis of the resource list, a first computing resource matching with a first number of parameters of the first layer from the multiple computing resources so as to process parameters associated with the first layer; and determining the mapping on the basis of the first layer and the first computing resource.

4. The method of claim 3, further comprising:

determining a first resource allocation required for processing parameters associated with the first layer;

updating the status information on the basis of the first resource allocation; and ranking the multiple computing resources on the basis of the updated status information so as to obtain an updated resource list.

5. The method of claim 4, further comprising: for a second layer neighboring the first layer among the multiple layers, selecting, on the basis of the updated resource list, a second computing resource matching with a second number of parameters of the second layer from the multiple computing resources so as to process parameters associated with the second layer; and determining the mapping on the basis of the second layer and the second computing resource.

6. The method of claim 5, wherein the layer list is ranked in order of the corresponding number, the resource list is ranked in order of status information of the multiple computing resources, and selecting the second computing resource comprises:

selecting a computing resource at an endpoint position of the updated resource list as the second computing resource.

7. The method of claim 1, wherein determining status information of the multiple computing resources comprises:

monitoring resource information of the multiple computing resources; and determining status information of the multiple computing resources on the basis of the resource information.

8. The method of claim 7, wherein the resource information of the multiple computing resources comprises at least any one indicator of:

processing capacity information, memory resource information and bandwidth resource information of a corresponding computing resource among the multiple computing resources.

9. The method of claim 1, wherein the multiple computing resources are multiple graphics processing units.

10. An apparatus for processing a neural network model-based computing task, comprising:

at least one processor;

a volatile memory; and a memory coupled to the at least one processor and having instructions stored thereon, the instructions, when executed by the at least one processor, causing the apparatus to perform acts comprising:

determining parameter data of multiple layers of the computing task associated with a neural network model in response to receiving the computing task, wherein the parameter data comprises one or more of a gradient, a weight, and a bias;

ranking a given number of layers of the multiple layers on the basis of a size of the parameter data so as to obtain a layer list, wherein the size of the parameter data is based at least in part on the number of parameters associated with each layer;

determining status information of multiple computing resources, wherein the multiple computing resources comprise dedicated computing resources located among multiple servers;

ranking the multiple computing resources on the basis of the status information of the multiple computing resources so as to obtain a resource list, the status information comprising one or more of an indicator of processing capacity information, an indicator of memory resource information and an indicator of bandwidth resource information of the multiple computing resources;

determining a mapping between a corresponding layer among the multiple layers and a corresponding computing resource among the multiple computing resources on the basis of the layer list and the resource list, the mapping indicating the corresponding computing resource among the multiple computing resources is to process parameters associated with the corresponding layer among the multiple layers; and causing allocation of the corresponding computing resource and processing the parameters associated with the corresponding layer based on the mapping;

wherein determining status information of the multiple computing resources comprises, for a given computing resource among the multiple computing resources:

determining importance of a corresponding indicator among the multiple indicators for the given computing resource on the basis of the computing task; and determining status information for the given computing resource on the basis of the importance of the corresponding indicator.

11. The apparatus of claim 10, wherein obtaining the layer list comprises:

obtaining a corresponding number of parameters comprised by a corresponding layer among the multiple layers on the basis of the parameter data; and ranking the multiple layers on the basis of the corresponding number so as to obtain the layer list.

12. The apparatus of claim 11, wherein determining the mapping comprises: for a first layer among the multiple layers, selecting, on the basis of the resource list, a first computing resource matching with a first number of parameters of the first layer from the multiple computing resources so as to process parameters associated with the first layer; and determining the mapping on the basis of the first layer and the first computing resource.

13. The apparatus of claim 12, the acts further comprising:

determining a first resource allocation required for processing parameters associated with the first layer;

updating the status information on the basis of the first resource allocation; and ranking the multiple computing resources on the basis of the updated status information so as to obtain an updated resource list.

14. The apparatus of claim 13, the acts further comprising: for a second layer neighboring the first layer among the multiple layers, selecting, on the basis of the updated resource list, a second computing resource matching with a second number of parameters of the second layer from the multiple computing resources so as to process parameters associated with the second layer; and determining the mapping on the basis of the second layer and the second computing resource.

15. The apparatus of claim 14, wherein the layer list is ranked in order of the corresponding numbers, the resource list is ranked in order of status information of the multiple computing resources, and selecting the second computing resource comprises:

selecting a computing resource at an endpoint position of the updated resource list as the second computing resource.

16. The apparatus of claim 10, wherein determining status information of the multiple computing resources comprises:

monitoring resource information of the multiple computing resources; and determining status information of the multiple computing resources on the basis of the resource information.

17. The apparatus of claim 16, wherein the resource information of the multiple computing resources comprises at least any one indicator of:

processing capacity information, memory resource information and bandwidth resource information of a corresponding computing resource among the multiple computing resources.

18. A computer program product, tangibly stored on a non-transitory computer readable medium and comprising machine executable instructions which, when executed, cause a machine to implement a method for processing a neural network model-based computing task, comprising:

determining parameter data of multiple layers of the computing task associated with a neural network model in response to receiving the computing task, wherein the parameter data comprises one or more of a gradient, a weight, and a bias;

ranking a given number of layers of the multiple layers on the basis of a size of the parameter data so as to obtain a layer list, wherein the size of the parameter data is based at least in part on the number of parameters associated with each layer;

determining status information of multiple computing resources, wherein the multiple computing resources comprise dedicated computing resources located among multiple servers;

ranking the multiple computing resources on the basis of the status information of the multiple computing resources so as to obtain a resource list, the status information comprising one or more of an indicator of processing capacity information, an indicator of memory resource information and an indicator of bandwidth resource information of the multiple computing resources;

determining a mapping between a corresponding layer among the multiple layers and a corresponding computing resource among the multiple computing resources on the basis of the layer list and the resource list, the mapping indicating the corresponding computing resource among the multiple computing resources is to process parameters associated with the corresponding layer among the multiple layers; and causing allocation of the corresponding computing resource and processing the parameters associated with the corresponding layer based on the mapping;

wherein determining status information of the multiple computing resources comprises, for a given computing resource among the multiple computing resources:

determining importance of a corresponding indicator among the multiple indicators for the given computing resource on the basis of the computing task; and determining status information for the given computing resource on the basis of the importance of the corresponding indicator.

19. The computer program product of claim 18, wherein obtaining the layer list comprises:

obtaining a corresponding number of parameters comprised by a corresponding layer among the multiple layers on the basis of the parameter data; and ranking the multiple layers on the basis of the corresponding number so as to obtain the layer list.

20. The computer program product of claim 19, wherein determining the mapping comprises: for a first layer among the multiple layers, selecting, on the basis of the resource list, a first computing resource matching with a first number of parameters of the first layer from the multiple computing resources so as to process parameters associated with the first layer; and determining the mapping on the basis of the first layer and the first computing resource.

* * * * *